Figure 1:
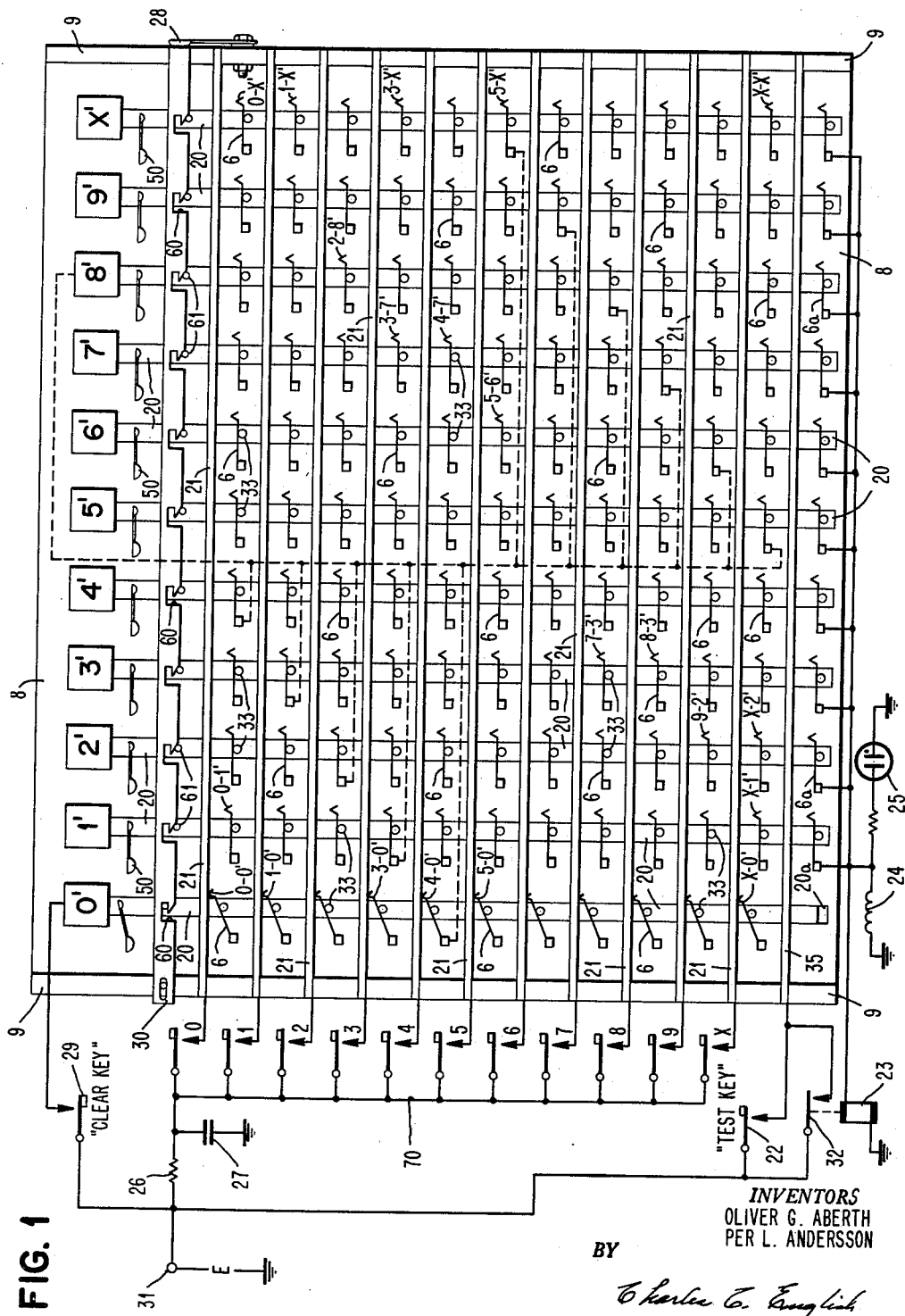

June 22, 1965   P. L. ANDERSSON ETAL   3,191,009
CHECK DIGIT VERIFIERS
Filed Aug. 17, 1961   3 Sheets-Sheet 1

INVENTORS
OLIVER G. ABERTH
PER L. ANDERSSON
BY
Charles C. English
AGENT

June 22, 1965    P. L. ANDERSSON ETAL    3,191,009
CHECK DIGIT VERIFIERS

Filed Aug. 17, 1961    3 Sheets-Sheet 2

INVENTORS
OLIVER G. ABERTH
PER L. ANDERSSON
BY
Charles C. English
AGENT

June 22, 1965   P. L. ANDERSSON ETAL   3,191,009
CHECK DIGIT VERIFIERS
Filed Aug. 17, 1961                     3 Sheets-Sheet 3

FIG. 4

| KEYS | DRAW BARS PULLED IN ("SET") | | | | | | | | | | |
|---|---|---|---|---|---|---|---|---|---|---|---|
|  | 0' | 1' | 2' | 3' | 4' | 5' | 6' | 7' | 8' | 9' | X' |
| 0 | 0' | 2' | 4' | 6' | 8' | X' | 1' | 3' | 5' | 7' | 9' |
| 1 | 2' | 4' | 6' | 8' | X' | 1' | 3' | 5' | 7' | 9' | 0' |
| 2 | 4' | 6' | 8' | X' | 1' | 3' | 5' | 7' | 9' | 0' | 2' |
| 3 | 6' | 8' | X' | 1' | 3' | 5' | 7' | 9' | 0' | 2' | 4' |
| 4 | 8' | X' | 1' | 3' | 5' | 7' | 9' | 0' | 2' | 4' | 6' |
| 5 | X' | 1' | 3' | 5' | 7' | 9' | 0' | 2' | 4' | 6' | 8' |
| 6 | 1' | 3' | 5' | 7' | 9' | 0' | 2' | 4' | 6' | 8' | X' |
| 7 | 3' | 5' | 7' | 9' | 0' | 2' | 4' | 6' | 8' | X' | 1' |
| 8 | 5' | 7' | 9' | 0' | 2' | 4' | 6' | 8' | X' | 1' | 3' |
| 9 | 7' | 9' | 0' | 2' | 4' | 6' | 8' | X' | 1' | 3' | 5' |
| X | 9' | 0' | 2' | 4' | 6' | 8' | X' | 1' | 3' | 5' | 7' |

*INVENTORS*
*OLIVER G. ABERTH*
*PER L. ANDERSSON*
BY
*Charles E. English*
AGENT

United States Patent Office 3,191,009
Patented June 22, 1965

3,191,009
CHECK DIGIT VERIFIERS
Per Lennart Andersson, Berwyn, and Oliver G. Aberth, Swarthmore, Pa., assignors to Sperry Rand Corporation, New York, N.Y., a corporation of Delaware
Filed Aug. 17, 1961, Ser. No. 132,151
9 Claims. (Cl. 235—153)

The present invention relates to improved systems for forming check symbols and verifying the accuracy of messages by use of such check symbols; and is more particularly concerned with providing a simplified apparatus for implementing the check system disclosed in our application Serial No. 746,521, filed July 3, 1958.

The concept of employing check digits in association with number sets is well known at the present time, and various systems have been suggested heretofore for computing a check digit corresponding to a given series of numbers and for thereafter operating with said series of numbers and its associated check digit to verify, throughout a series of computations, that the number is being properly transmitted or employed without alternation, transposition, or the like, of any numbers comprising said series. In general, the series of numbers is treated in accordance with a predetermined mathematical rule to determine a check digit which corresponds to that series of numbers; and in particular, the individual numbers of a series of numbers may be weighted, added and subtracted from one another, and otherwise treated to produce a single further number termed a "check digit" which accompanies the original series of numbers. The check digit thus computed is such that if any one number of the original series is altered, or if a transposition is made of any two numbers of the original series, the resulting modified series will have a check digit other than that originally computed, whereby computation of the check digit associated with any given series of numbers and comparison of this computed check digit with a previously computed check digit, known to be proper for the original series, immediately determines whether or not any errors have occurred. The use of such check digits, and in particular the improved check digit verifier apparatus contemplated by the present invention, will be more readily appreciated from the following discussion.

When information is entered into a data processing machine such as a bookkeeping machine, card punch machine, paper tape perforator, teletype machine, etc., some means of detecting an error in the entry of such information is desirable. When such information is entered manually, via a keyboard, such error detection is not only usually desirable but frequently imperative. Since the multiplicity and variety of errors introduced by manual operation is far greater than those introduced by machine operation, the following discussion and description will be restricted to keyboard type entries in order to simplify the illustration of the concept of this invention. It is to be understood, however, that this limitation in the discussion should not be construed as limiting the invention to keyboard operation. Often the information handled is of such a nature that errors are apparent upon inspection; and this is particularly the case when ordinary plain text English is processed on a typewriter or type setting machine. Also in many commercial applications numerical keyboard entries can be checked by the use of the appropriate controlling totals.

The use of check symbols or check digits necessitates appending to each group of N symbols, $S_N$, $S_{N-1}$ * * * $S_2$, $S_1$ comprising an individual entry, an extra symbol $S_0$, termed the "check symbol" or "check digit" which increases the length of the entry to N+1 symbols. The choice of the particular check symbol employed for any entry is fixed according to some predetermined rule by the original symbols in the series $S_N$, $S_{N-1}$ * * * $S_1$. Normally, when the entry is made via a keyboard, the assignment of check symbols is made as each symbol group originates, so that the person operating the keyboard is usually presented with a complete sequence $S_N$, $S_{N-1}$ * * * $S_2$, $S_1$, $S_0$, which includes not only the original number series but which includes as well the check symbol as the last symbol or digit of the sequence.

Some verifying mechanism adapted to cooperate with this resulting series may then be attached to the data processing machine; and this mechanism preferably communicates with the keyboard and is so constructed that it is capable of independently calculating the appropriate check symbol for the number being fed into the machine via the keyboard. Thus, when an entry is made correctly on the keyboard, the entered check symbol and the check symbol calculated by the said verifying mechanism will agree with one another thereby indicating that no error of entry has been made. If, however, the operator in entering the sequence has made an error in striking the keys, then, since the verifying mechanism receives an entry differing from the original number series, it is to be expected that its calculated check symbol and the one entered by the operator will disagree. Such a discrepancy can be indicated by an appropriate signalling device such as a glow lamp and/or keyboard lock; and this indicating device can serve to warn the operator of his error, thereby allowing him to correct it.

To illustrate a particular mode of assigning check symbols, according to our application above-identified, it is convenient to restrict the discussion temporarily to the case of numeric entries. Accordingly, let us assume that a keyboard has only ten keys for the digits zero through nine inclusive. Check symbols may be assigned in the following manner: For each original entry consisting of N digits, $A_n$, $A_{n-1}$, * * * $A_1$, the weighted sum of the digits $$k_n A_n + k_{n-1} A_{n-1} + * * * + k_1 A_1 = \Sigma kA$$

is formed. In this weighted sum, the $k$'s are integers and their values may, in one embodiment, be $k_1=2$, $k_2=4$, $k_3=8$, $k_4=5$, $k_5=10$, $k_6=9$, $k_7=7$, $k_8=3$, $k_9=6$, $k_{10}=1$, $k_{11}$ through $k_{20}$ have the same values as $k_1$ through $k_{10}$, respectively; $k_{21}$ through $k_{30}$ are also equal to $k_1$ through $k_{10}$, etc., for as many $k$'s as are necessary to form the weighted sum. It should be noted that the weights thus selected have the property that each weight is the double of the preceding weight, counting in modulo 11. More specifically, and noting that in this embodiment only ten keys or ten different characters are assumed, the $k$'s are so chosen that $K_i+1$ equals either $2k_i$ or $2k_i-11$. When the weighted sum for a digit group has been found, the check digit is then chosen as the smallest integer (including zero) which, when added to the weighted sum makes the result an exact multiple of eleven, i.e., the check digit or check symbol employed is the 11's complement of the weighted sum discussed above.

By way of example, a check digit for the number 352566 may be derived, using the weights mentioned previously, by forming the weighted sum:

$$3\times9+5\times10+2\times5+5\times8+6\times4+6\times2=163$$

Since the sum 163 is itself not a multiple of 11, and inasmuch further as 165 (i.e., 163+2) is the smallest multiple of 11 greater than 163, the check digit for this entry is 2. This digit 2 is accordingly appended to the original number series so that the operator actually enters 3525662. Since the check digit can have eleven different values, e.g., 0 through 10, an extra key must be added to the numeric keyboard for entering the value of ten; and a special symbol $x$ may be used to indicate this added key.

As mentioned previously, a check digit verifier is preferably employed, and is attached to the keyboard of the overall structure to detect any entry errors which may occur. Such a verifying mechanism may be simplified in design by recognizing the following considerations. First, it should be noted that the weighted sum of the original digits of the entry plus the check digit must always be a multiple of eleven (i.e., as mentioned previously, the check digit selector is preferably the 11's complement of the weighted sum of the original number series). Therefore, rather than requiring that the verifying mechanism compute the proper check digit and then compare its selection with the check digit actually entered by the operator, with a discrepancy signalling an error, it is sufficient to require that the verifying mechanism form the weighted sum of the entire entry (including the appended check digit, having a weight of "one" assigned thereto); and the verifying mechanism can then signal an error only if the sum computed thereby is not zero, or a multiple of eleven.

As a second consideration, it should be noted that since all that is needed is a determination of whether or not the computed sum is zero or a multiple of eleven, the mechanism can be permitted to discard eleven whenever it attempts to form a sum higher than eleven. By way of example, if the verifying mechanism contains a partial result of 8, and 7 is to be added thereto to form the true sum of 15 (i.e., 11 plus 4), it is permissible to have the mechanism merely form the number 4, i.e., the verifying mechanism may be so constructed as to automatically discard 11's as they occur during formation of the weighted sum.

Finally, because of the relationship between the $k$'s, namely that $k_{i+1}$ equals either $2k_i$ or $2k_i-11$, the mechanism can prove the check digit in the following manner: Starting from a cleared or zero position, the mechanism accepts the first digit entered, $A_n$, then doubles this number and adds it to the next digit entered, $A_{n-1}$; doubles this new result, etc.; and proceeds in this manner to add each digit as it is entered, with a subsequent doubling of the result, until all digits including the check digit, have been accepted. Whether or not the proper check digit has been entered can then be determined by detecting whether or not the final result contained in the verifying mechanism is a multiple of 11 (or zero, since multiples of 11 are dropped).

To verify the foregoing doubling and adding technique, let us assume that the entry consists of the sequence $A_n$, $A_{n-1}$ * * * $A_1$, $A_0$, where $A_0$ is a proper check digit, and no operator error has been made. After $A_n$ is entered, the verifying mechanism will contain either $2A_n=k_1A_n$ itself, or some number differing from this by a multiple of 11. After $A_{n-1}$ is entered, the result will differ from $2(k_1A_n+A_{n-1})=k_2A_n+k_1A_{n-1}$, only by a multiple of 11 (or zero). Similarly, after $A_{n-2}$ is entered, the result will be $2(k_2A_n+k_1A_{n-1}+A_{n-2})=k_3A_n+k_1A_{n-2}$, except for a possible multiple of 11. Finally, after $A_1$ has been entered, the mechanism will contain $$k_nA_n+k_{n-1}A_{n-1}+* \ * \ *k_1A_1$$

minus a multiple of 11.

Inasmuch as $A_0$, the check digit or check symbol, has been chosen equal to the smallest integer which when added to the above weighted sum will cause the result to be a multiple of 11, its entry must cause the mechanism to hold zero, or a multiple of 11 as the final sum, when the further property of the mechanism of discarding 11's is taken into consideration. Note especially that in spite of the fact that $A_0$ is the check digit, it is handled by the mechanism in exactly the same manner as the other digits. Its addition causes a sum of zero to be obtained, and the subsequent doubling of zero preserves this zero result. The choice of $A_0$ as the 11's complement of the weighted sum $\Sigma kA$ allows it to be treated in this manner, with a subsequent economy in the mechanism.

A specific example has been given previously for the formation of a check digit for the number 352566 by using the weights:

1, 6, 3, 7, 9, 10, 5, 8, 4, 2 where 2 is the weight of the least significant digit; and it will be recalled that the check digit computed by using these weights was determined to be 2. The validity of utilizing the doubling and addition process as an equivalent method of forming the check digit will be perhaps most readily apparent by a specific example showing how this process may be applied to the same number 352566. The steps would be as follows:

(1) Doubling 3 gives 6;
(2) Adding 5 gives 11; and by casing out 11's we have the partial result of zero;
(3) Doubling zero gives zero; and adding 2 gives 2;
(4) Doubling 2 gives 4; and adding 5 gives 9;
(5) Doubling 9 gives 18; and by casting out 11's this equals 7;
(6) Adding 6 gives 13; and by casting out 11's results in a sum of 2;
(7) Doubling 2 gives 4 and adding 6 gives 10;
(8) Doubling 10 gives 20 and by casting out 11's produces a final weighted sum of 9;
(9) The check digit is now, in accordance with the principles discussed above, selected so as to be the 11's complement of the weighted sum thus computed; and accordingly, the check digit is produced by subtracting 9 from 11 thereby producing a check digit or symbol of 2. It will be noted that this is the same check digit which was derived previously.
(10) The addition and doubling process has been illustrated above as an alternate method for calculation of the check digit in accordance with the fact that $\Sigma kA$ minus a possible multiple of 11 is obtained after the addition and doubling process is performed on the digits $A_n$ to $A_1$. Assuming that the check digit of 2 has been previously calculated, then continuing the process to include it, we obtain a sum of 11 upon adding 2 to 9, and dropping the multiple of 11 to get zero, and doubling, a result of zero is obtained, which would indicate an error-free entry in the case of a verifying mechanism. Accordingly this example has illustrated the addition and doubling process both as a means of calculation of check digits and as a means of verifying entries which already have check digits appended to them.

The particular system of weights discussed above, and the verifying or proving mechanisms constructed in accordance with the present invention and adapted to operate with such a weighting system, has a number of distinct advantages. First, all entries, including the check digit entries, can be made of the same keyboard. Second, the mechanism checks entries of any length, and nevertheless is capable of detecting the common errors discussed previously, notwithstanding, the length of the entry. Third, since all digits of an entry are treated alike, there is no need for any device to indicate the position of a digit entered. If the $k$'s in the weighted sum are chosen arbitrarily (rather than in accordance with the rule of weighting characterized by the present invention) this would not be the case. Fourth, the verifying mechanism can be constructed to perform the simple doubling and addition steps discussed previously whereby the resulting mechanism may assume relatively simple mechanical, electro-mechanical, or electrical configurations; and as a result, the actual verifying mechanism is simple, inexpensive to manufacture, and easily installed and maintained.

It will be recalled that the $k$'s used in the weighted sum $\Sigma kA$, discussed above, were related to one another by the relationship of $k_i+1=2k_i-11$, thus allowing the proving or verifying mechanism to employ a process of doubling, adding, doubling, etc. As a general matter, if the $k$'s had been chosen differently so that $k_1+1=ck_1$ minus a possible multiple of 11, and $k_1$ equals $c$, then essentially the same principle of proving the check digit could be used in the mechanism except that instead of adding and doubling, the process could comprise adding and multiplying by the constant $c$. For certain $c$'s, however, there is a loss of error detection ability since the $k$'s do not exhaust the integers 1 through 10. For example, if $c$ equals 10 and $k_1$ equals 10, then $k_2$ equals 1, $k_3$ equals 10, $k_4$ equals 1, $k_5$ equals 10, etc. For $c$ equals 6, 7 or 8, however, ten different $k$'s are still obtained.

It should moreover be noted that the entire preceding discussion has assumed that the system of weighting and the computations relating to the derivation of a check symbol and verification of a number series thereby, has employed the modulo 11. The number 11, as a practical matter, however, does not play an exclusive role in the selection of check digits; and any prime number greater than the number of keys (which, in the case of a numeric keyboard is any prime number greater than 10) will suffice. By a prime number is meant an integer divisible only by 1 and by itself.

For example, one could choose the $k$'s such that $k_1+1=ck_1$ minus a possible multiple of 13; and we could then require that the check digit to be employed is the smallest integer which when added to the weighted sum $\Sigma kA$ makes the result a multiple of 13 (i.e., the check digit can be the 13's complement of the computed weighted sum). When this alternative number base is employed, the same principle of adding and multiplying by $c$ could be employed in the proving or verifying mechanism except that now multiples of 13 are allowed to be dropped or are cast out during formation of the partial sums. It should be noted, however, that since there will now be 13 possible values for the check digit, three extra keys must be added to the numeric keyboard to enter check digits corresponding to the numbers 10, 11 and 12. Similar considerations apply when any other prime number, e.g., 17, 19, 23, etc. is selected.

It should moreover be noted that the system of assigning check digits, and the principle of the proving or verifying mechanisms discussed above, can easily be generalized to accommodate any type of keyboard. Thus, the keyboard can be numeric, alphabetic, mixed alphabetic and numeric, and may even include uncommon symbol keys. These particular forms of keyboards can then be employed by simply assigning the integers 0, 1, 2, etc., in some fashion to the different keys, and by then choosing, as the number base, a prime number $P$ greater than or equal to the number of keys. The weights $k$ are still fixed as before according to the rule $k_1+1=ck_1$ minus a possible multiple, $m$, of $P$, with $k_1$ equal to $c$ itself. The check symbol of the entry $S_n$ $S_{n-1} * * * S_1$ is then designated as that symbol whose assigned key number will make the weighted sum of the entry equal to a multiple $m$ of $P$ (i.e., the check symbol is the P's complement of the computed weighted sum). It will be noted, however, that if $P$ is greater than the original number of keys, it will be necessary, as mentioned previously, to add special check symbol keys.

In the case of numeric keyboards, the choice of the check digit was made equal to the smallest integer which when added to $\Sigma kA$ makes this sum a multiple of 11. This choice was made to allow simplicity in the design of the verifying mechanism in that a final result of zero of the mechanism is the indication of a proper entry and a non-zero result indicates an error. Calling this choice of check digit $A_0$ for an entry $A_n A_{n-1} * * * A_1$, a possible alternate choice of check digit (say $A_0'$) is: $A_0'=A_0+d$, where $d$ is a fixed integer chosen from 1 to 10, the above addition to be, of course, performed in radix or modulo 11.

This method of choosing check digits affects the verifying mechanism only to the extent that the final result, instead of always being zero, is $2d$ (doubling of the check digit entry doubles $d$), and a non-$2d$ result indicates an error.

A similar generalization applies to the case of the generalized keyboard, with arithmetic performed in modulo $P$, except that $d$ can be chosen from 1, 2 * * * $P-2, P-1$. Indeed, a similar generalization applies to multiplying by $c$, except that the final (i.e., correct) result is now $cd$.

It has been implied in the foregoing discussion that the keyboard is not full bank, i.e., that it does not have a separate row of keys for each symbol position, as in desk calculating machines. This latter type of keyboard can also be protected against errors, however, except that here an extra set of keys must be added for the check symbol, and some device should be included in the proving or verifying mechanism which will switch its input in proper sequence through the different sets of depressed keys.

It will also be noted that while the mechanisms discussed above have been termed check digit verifiers and have been mentioned as operative to accept a series of numbers, including a check digit, to determine whether or not the number is correct, the verifiers of the present invention can easily be converted to actually compute and indicate what the check digit for a given input series of numbers should be. Indeed, as will become apparent from the subsequent discussion, the check digit verifier of the present invention, as they operate, form the weighted sum of the input numbers, and this weighted sum can merely be computed, whereafter the mechanism can then signal just what the proper check symbol for the input series should be.

It is accordingly an object of the present invention to provide a simplified apparatus for forming and verifying check digits.

Another object of the present invention resides in a simplified apparatus which, when given a series of numbers, will generate a digit whose value will change if any one number of the series is altered or if transposition is made of any two numbers in the series. In addition, certain types of more complex transpositions, common to keyboard operation, (such as BAAB for ABBA, etc.) can be detected.

In providing for the foregoing objects and advantages, the present invention contemplates the formation and utilization of check digits computed by a modulo $P$ check system, where $P$ is any prime number greater than the number of different characters to be represented; and the $P$ chosen for purposes of illustration hereinafter is 11. The particular method of computation employed is as follows: Given a series of numbers, which series may be of any length, the most significant digit in the series is first doubled. The next most significant digit is then added to this double quantity and the result is again doubled. The resulting doubled quantity is thereafter increased by the third most significant digit whereafter the resulting sum is doubled again, etc. In short, each number of the series, commencing with the most significant digit thereof, is added and then the result doubled, added to the next most significant digit, the resulting sum doubled again, etc' This "doubling" procedure must again be understood to comprise merely a preferred form of the present invention, given for purposes of illustration and, in accordance with the preceding discussion, it will be appreciated by those skilled in the art that rather than using a common multiplier 2 (or doubling), other multipliers $c$ can be employed.

If at any time the partial result occurring by reason of a doubling (or common multiplying) or addition step exceeds the number $P$, $P$ is subtracted from the number (i.e., the system contemplates a "casting out" of P's) with the process continuing with the remainder. The process thus described of adding and multiplying digits of the original number is continued for all of the digits; and the final check digit of the process is chosen to be the P's complement of the final result of the aforementioned addition and multiplying process.

Whenever the original series of numbers is to be employed during a computation or other procedure associated with that series of numbers, the series and its accompanying check digit is fed into a check digit verifier which is adapted to compute a check digit corresponding to the original series of numbers and adapted to further compare the check digit so computed with the check digit accompanying this original series of numbers. If the computed check digit and accompanying check digit differ from one another, this, of course, indicates that an error has occurred somewhere in connection with the number being operated upon, wherefore this number is rejected until the ntaure of the error can be found.

Figure 2:
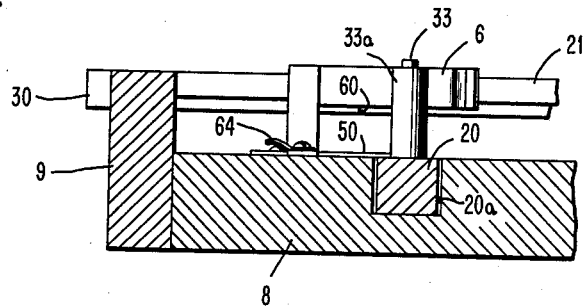
Figure 3:
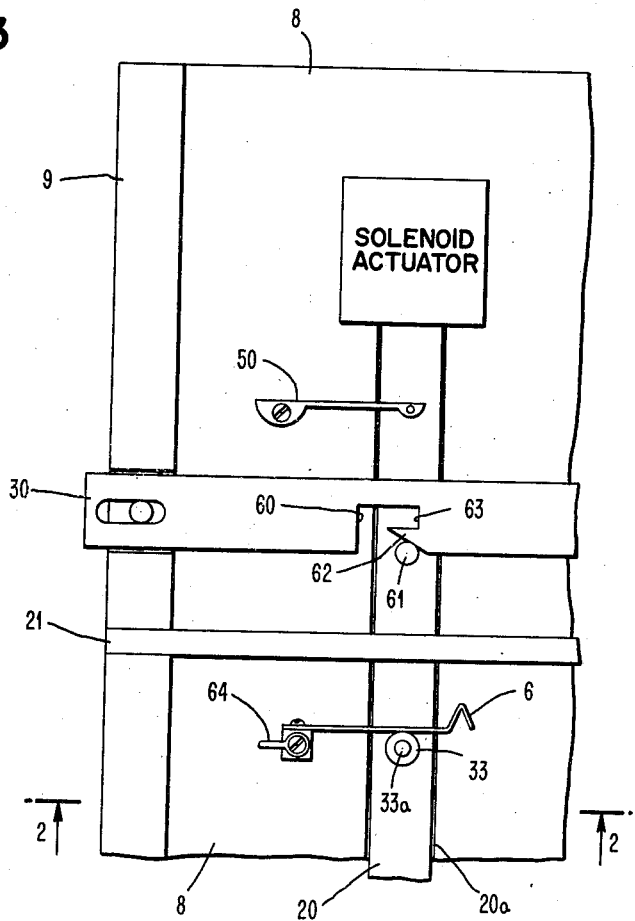

The foregoing objects, advantages, construction and operation of the present invention will become more readily apparent from the following description and accompanying drawings in which:

FIGURE 1 shows in partial diagrammatic and partial schematic form one embodiment of this invention, FIGURE 2 shows in cross-section the draw bar and in side elevation one typical movable contact of the switching matrix shown in FIGURE 1, FIGURE 3 is a top elevational view of a portion of FIGURE 1 showing in more detail the lock bar, a single bus bar and movable switch contact, and FIGURE 4 is a chart useful in explaining the operation and the circuit interconnections of the embodiment shown in FIGURE 1.

Referring now to FIGURES 1, 2 and 3 there is shown one embodiment of the present invention suitable for use with a ten character message transcriber such as a ten key keyboard adding machine, paper tape punch or the like. The illustrated embodiment utilizes the modulo 11 counting system herein before described. The weights $Ki$ assigned to the characters comprising the message obey the expression $ki = 2^i$ where $ki$ is the weight assigned to each character and $i$ indicates the order position of the character reading from right to left. Thus for $i=1$, $k_1=2$; for $i=2$, $k_2=4$ and so on as previously described. In operation, the switching matrix of FIGURE 1 automatically functions to add, in a single step, each newly entered digit to the result stored in the matrix and to double the new result discarding 11's as they occur in the weighted sum. It will be understood, of course, that the matrix of FIGURE 1 could easily be extended to operate on other prime modulo counts such as 13 etc., and that the weight scheduling rather than following the powers of 2 schedule could also follow powers of 3 etc. all as previously described without departing from the teaching of the invention.

As herein exemplified, the ten key keyboard input to the system comprises ten keys labelled 0 to 9 each of which has a movable contact adapted to be momentarily closed onto a corresponding stationary contact upon manual operation of the keys. Since a modulo 11 system is used an extra input key labelled X is added to accommodate the insertion of check digits having a value of 10. The movable contacts of the input keys are all electrically connected together via lead 70 and to a source of voltage 31 through a pulse forming resistance 26 and condenser 27 circuit. The stationary contacts of the keyboard inputs are each connected to a respective bus bar typified at 21. The bus bars, copper for example, are elongated conductor elements supported in parallel fashion over a suitable insulating base member 8 by a pair of insulated upright support members 9 attached to opposite sides of the base plate 8. A separate group, eleven in the modulo 11 system, of flexible contact blades 6 are spatially arrayed along and associated with each of the bus bars as shown to form a switching matrix consisting of eleven columns and eleven rows of switching elements. The corresponding flexible contact blades of each of the columns are mechanically ganged together by separate solenoid operated draw bars so that they may be operated in unison to close on their corresponding bus bars 21.

As shown in the figures this ganging can be by separate draw bars 20 for example and solenoids 0' to X'. These draw bars 20 can be fabricated of metal or insulating material and are adapted to be slidably held in suitable grooves 20a formed in the insulating base plate 8 on which the movable contacts 6 can be mounted. Each of the draw bars is equipped with suitable switch pins 33 against which the flexible contact blades 6 of the switching matrix may bear. With this construction, moving a draw bar vertically upward as viewed in FIGURE 1 (by actuation of an appropriate solenoid 0' to X') will urge all of the contact blades comprising the associated column of switch elements into electrical contact with their associated bus bars 21.

If the draw bars 20 and switch pins 33 are fabricated of metal the separate insulating sleeves 33a should surround each of the switch pins 33 to prevent the drawbars and switch pins from shorting the contact blades of the column together. If, however, either the draw bar 20 or the switch pins are made of insulating material then the inuslating sleeves 33a may be dispensed with.

For future reference, the switch elements making up the switching matrix may be identified as follows: the first switching elements in the first column and first row can be labelled 0–0', the second switching element in the first row as 0–1', the second switching element in the first column as 1–0' and etc. The convention, here, being that the first reference characters of a pair designates the key order associated with the switching element and the second reference character of a pair designates the column or solenoid order of the switching element.

To control the actuation of the draw bar, separate solenoid actuator elements labelled 0' to X' are operably coupled in a conventional manner to each of the draw bars at one end thereof and separate spring return elements 50 for normally retracting the draw bars may be attached to the same or other ends thereof.

A latch mechanism or "lock bar" 30 for holding "in" one of the draw bars at a time and therefore holding the switching elements of a single column in a closed position is shown extending across the draw bars 20 at one end thereof. This lock bar, shown in more detail, in FIGURE 3, is spring biased to the left in FIGURE 1 by a spring 28. A plurality of reentrant notches 60 (FIGURE 3) formed in the lock bar for engaging suitable lock pins 61 associated with each of the draw bars. Each of the notches 60 contains a tooth 62 located at the entrance to the notch and a reentrant portion 63 for engaging and holding the lock pin 61 after the solenoid has been energized. The operation of the lock bar is such that upon energization of a solenoid; the corresponding draw bar will be pulled in toward the lock bar. As this occurs, the lock pin pushes against the tooth 62 on the lock bar moving the lock bar to the right against the tension of spring 28, as viewed in FIGURE 1, whereby any engaged draw bar is released and returned to its normal position by the action of the corresponding return spring 50. After the lock pin 61 clears the tooth 62, the tension of spring 28 moves the lock bar to the left causing the lock pin 61 to rest on the reentrant portion 63 thereby locking the pulled in draw bar in the set position.

The flexible contact blades 6 of the switching elements situated in each column is connected via a wired soldering tab 64 (or printed circuit conductor) to a different one of the solenoid actuators 0' through X'. These connections are made so that a pulled in actuator 0' to X' which indicates the present sum stored in the switching matrix will: (1) add the newly entered digit to the stored sum; (2) double this result by actuating a new solenoid actuator all in a single step. To simplify the illustration in FIGURE 1 only those switching elements which connect to the 8' actuator are shown in the figure. These connections are shown in dotted line form.

To illustrate how the connections automatically effect the summing and doubling operation assume that the switching matrix is "cleared" to store a zero. This means that the 0' actuator has been pulled in and is locked into a pulled in or "set" position by the lock bar 30. At this time all other actuators are cleared or returned to a normal position by the return springs 50 such as shown in FIGURE 1. All of the flexible contact blades associated with the 0' actuator are closed onto the respective bus bars 21. Now assume that the digit 4 is to be entered into the matrix. An operator momentarily closes input key 4 whereby the charge stored on condenser 27 will appear on the bus bar 21 associated with key 4. This voltage pulse will be applied through the closed contacts of switching element 4–0' to actuator 8' pulling in this actuator. As actuator 8' pulls in, the draw bar 20 associated with actuator 0' is released by the lock bar 30 and the draw bar 20 associated with actuator 8' is locked into the set position. To summarize, a zero had previously been stored in the matrix, and a four was entered. Four plus zero is four, and four doubled is 8 hence the actuation of actuator 8'.

To better illustrate the inter-connection of solenoid actuators to switching elements the chart of FIGURE 4 is referred to. In this figure the vertical columns labelled 0' to X' correspond to a pulled in or "set" draw bar 20. The horizontal rows labelled 0 to X correspond to the keys 0 to X of the keyboard. At the intersection of a column and a row is indicated the solenoid which is to be actuated as a result of the actuation of that key with that draw bar pulled in or "set." The switching elements of the switching matrix which are connected to each actuator can be identified from the row and column order numbers given in the chart. As an example, the 0' actuator is connected to the following switching element in the matrix.

```
0—0'
X—1'
9—2'
8—3'
7—4'
6—5'
5—6'
4—7'
3—8'
2—9'
1—X̄'
```

Continuing with the present example assume after the digit 4 has been entered and the 8' actuator actuated, that a digit 2 is to be entered. The operator momentarily closes the input key 2. A voltage pulse appears on the associated bus bar 21 from whence it would pass through the closed contacts 2–8' and from the chart in FIGURE 4 it would actuate actuator 9', locking up the associated draw bar and releasing the draw bar associated with actuator 8'. To summarize, an eight was previously stored in the matrix and the digit 2 was to be added. Eight plus two is ten and ten doubled is twenty, but twenty counted to module 11 equals nine, hence the actuation of the 9' actuator.

Returning to FIGURE 1, it should be noted that the resistance 26 and condenser 27 operates so that the condenser 27 is used to supply a momentary surge of current upon closure of one of input keys of sufficient magnitude to immediately pull in one of the actuators 0' to X' while resistor 26 is added to limit any sustained current flow, to a value such that only one actuator would be energized thereby. This prevents a double entry being made by an operator such as might arise if an operator were to close one input key while holding another input key closed.

To further illustrate the operation of the present invention, let it be assumed that the previously discussed number 352566 with the check digit (2) is to be entered and verified. The switching matrix is first cleared to zero such as by the momentary manual closure of the clear key 29 connected between the source 31 and the 0' actuator. With the aid of the chart in FIGURE 4, it will be seen that upon entering the digit 3, actuator 6' is actuated and 0' released. Upon entering the next digit 5 actuator 0' will again be actuated and actuator 6' released. Upon entering the digit 2, actuator 4' will be actuated and actuator 0' released. Upon entering the digit 5, actuator 7' will be actuated and actuator 4' released. Upon entering the first digit 6, actuator 4' will again be actuated and actuator 7' released. Upon entering the second digit 6, actuator 9' will be actuated and actuator 4' released. Finally upon entering the check digit 2 the 0' actuator will be actuated and the 9' actuator released. The verification of the accuracy of the transcription of the message rests in the fact that after the message complete with check digit has been entered, the switching matrix should return to the cleared or zero position.

To check for inaccuracy in message transcription, a test key 22 and associated bus bar 35 have been added. Associated with the bus bar 35 is a separate set of ten contacts 6a, one associated with each of the columns of switching elements except the 0' column making up the aforedescribed switching matrix and each likewise ganged to a corresponding draw bar 20 and operated thereby. The movable contacts of the test group associated with actuators 1' through X' are connected together and to a parallel circuit comprising a neon "Error" signal lamp 25, a keyboard "lock" solenoid 24 and an error relay 23.

The test key 22 connects the voltage source 31 to the test bus bar 35 and is momentarily actuated by the operator after the entry of a message including the check digit assigned thereto to determine the accuracy of the transcription. As an example, assume an error wherein after the entry of the check digit of the message one of the actuators 1'–X' other than 0' is pulled in. When the operator momentarily closes the test key 22, the voltage of source 31 is applied to the associated bus bar 35 and from thence through the closed test contacts 6a of the actuated draw bar to the parallel circuit, lighting the neon indicator lamp 25, energizing the keyboard lock actuator 24 and the error relay 23. The latter closes a set of holding contacts 32 which maintain the application of the voltage 31 on the bus bar 35 and thereby signal the operator that an error has occurred. The keyboard lock actuator locks the input keyboard by means not shown but well known in the art and prevents further entry into the switching matrix until the matrix is cleared by closure of the clear key 29.

We claim:

1. A message verifier for employment with a key set to verify the accuracy of a keyboard entry comprising, a plurality of bus bars, similar pluralities of switch contacts associated with each of the bus bars, separate mechanical linkages ganging together the corresponding switch contacts of each plurality of contacts to form separate switching sets adapted upon actuation of a linkage to close the contacts of a set onto the corresponding bus bars, a separate electrical actuator for each mechanical linkage, means connecting each contact of a set to a different actuator, a mechanical latching mechanism engaging said linkages and adapted to hold one of said switching sets closed onto the bus bars at a time, means for energizing said bus bars in accordance with the actuation of said keys on its keyboard, whereby a circuit will be completed through the energized bus bar, a closed contact of an actuated ganged switching set and thence to the appropriate actuator connected to said closed contact, and means carried by each of said likages for actuating said latch mechanism to release a locked linkage and to lock up a new linkage.

2. A message verifier for employment with a key set to verify the accuracy of a keyboard entry comprising, a plurality of bus bars, similar pluralities of switch contacts associated with each of the bus bars, separate mechanical linkages ganging together the corresponding switch contacts of each plurality of contacts to form separate switching sets adapted upon operation of the linkage to close the contacts comprising the set onto the corresponding bus bars, a separate electromechanical actuator for each mechanical linkage, means connecting each contact of a set to a different electro-mechanical actuator, a mechanical latching mechanism engaging said linkages and adapted to hold one of said switching sets closed at a time onto the bus bars, means for electrically connecting each key on the keyboard to a different bus bar, and means carried by said linkages for operating said latch mechanism to release a locked linkage and to lock up a new linkage upon actuation of any one linkage.

3. In combination, a keyboard having a plurality of keys, a plurality of bus bars equal in number to its number of keys, a plurality of switch contacts equal in number to the number of keys associated with each bus bar, separate mechanical linkages ganging together corresponding contacts to form ganged switching sets adapted upon operation of the linkage to close the contacts comprising the set onto the corresponding bus bars, a separate electro-mechanical actuator for each linkage, means connecting each contact of a set to a different electro-mechanical actuator, a mechanical latching mechanism engaging said linkages and adapted to hold one of said switching sets closed at a time onto the bus bars, means for electrically connecting each key on the keyboard to a corresponding bus bar, and means carried by said linkages for operating said latch mechanism to release a locked linkage and to lock up a new linkage upon actuation of any one linkage.

4. In combination, a keyboard having a plurality of keys, a plurality of bus bars equal in number to the number of keys, a plurality of contacts equal in number to the number of keys spatially arranged along each bus bar, the contacts associated with each bus bar forming rows of contacts and the corresponding contacts associated with adjacent bus bars forming columns of contacts, separate mechanical linkages ganging together the contacts of each column and adapted upon operation of the linkage to close the contacts of the column onto the corresponding bus bars, a separate electro-mechanical actuator for each linkage, means connecting each contact of a set to a different electro-mechanical actuator, a mechanical latching mechanism engaging said linkages and adapted to hold one of said switching sets closed at a time onto the bus bars, means for electrically connecting each key on the keyboard to a corresponding bus bar, and means carried by said linkages for operating said latch mechanism to release a locked linkage and to lock up a new linkage upon actuation of any one linkage.

5. The combination of claim 1 wherein there is included an additional bus bar, an additional plurality of contacts associated with said additional bus bar each of which is ganged to a corresponding linkage and operated thereby, all of said additional contacts being connected together and to an indicator circuit, and a test key means connected to said additional bus bar for selectively energizing the same.

6. The combination of claim 2 wherein there is included an additional bus bar, an additional plurality of contacts associated with said additional bus bar each of which is ganged to a corresponding linkage and operated thereby, an indicator circuit, a test key means connected to said additional bus bar to selectively energize the same, and means connecting all of the additional contacts together and to said indicator circuit.

7. The combination of claim 4 wherein there is included an additional bus bar, an additional plurality of contacts associated with said additional bus bar each of which is ganged to a corresponding linkage and operated thereby, an indicator circuit, a test key means connected to said additional bus bar to selectively energize same, and means connecting all of said additional contacts together and to said indicator circuit.

8. In a verifier having a plurality of keys, a plurality of switching elements arranged in rows and columns to form a switching matrix having a number of rows equal to the number of keys and a number of columns also equal to the number of keys, separate mechanical linkages ganging the switching elements of each column together whereby the switching elements in any column may be actuated in unison, a respective electro-mechanical actuator for each linkage, a latching mechanism engaging all of said linkages and operative to hold the switching elements in one column closed and further operative upon actuation of a new linkage to release the closed column of switching elements and to lock a new column of switching elements closed, and a connection between each switching element of a column and each electro-mechanical actuator.

9. The combination of claim 8 wherein there is included an additional row of switching elements, each of said switching elements of said additional row being ganged to a corresponding linkage and operated thereby, an indicator circuit, all of said additional row of switching elements being connected together in parallel and to said indicator circuit, and a test key means connected to said additional row of switching elements and adapted to selectively energize the same upon actuation of said test key.

References Cited by the Examiner

UNITED STATES PATENTS 2,684,201 7/54 Starreveld et al. _____ 235—153
2,776,091 1/57 Chenus _____ 235—61.7

MALCOLM A. MORRISON, *Primary Examiner.*

WALTER W. BURNS, JR., *Examiner.*